(12) United States Patent
Gamwell et al.

(10) Patent No.: US 10,899,956 B2
(45) Date of Patent: Jan. 26, 2021

(54) USE OF CROSSLINKED POLYMER SYSTEM FOR MITIGATION OF ANNULAR PRESSURE BUILDUP

(71) Applicant: Halliburton Energy Services, Inc., Houston, TX (US)

(72) Inventors: Chase R. Gamwell, Spring, TX (US); Samuel Lewis, Spring, TX (US); Thomas S. Sodhi, New Caney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/754,253

(22) PCT Filed: Aug. 31, 2015

(86) PCT No.: PCT/US2015/047738
§ 371 (c)(1),
(2) Date: Feb. 21, 2018

(87) PCT Pub. No.: WO2017/039616
PCT Pub. Date: Mar. 9, 2017

(65) Prior Publication Data
US 2018/0291251 A1 Oct. 11, 2018

(51) Int. Cl.
*E21B 33/14* (2006.01)
*C09K 8/40* (2006.01)
*C09K 8/38* (2006.01)

(52) U.S. Cl.
CPC .............. *C09K 8/40* (2013.01); *C09K 8/38* (2013.01); *E21B 33/14* (2013.01)

(58) Field of Classification Search
None
See application file for complete search history.

(56) References Cited

U.S. PATENT DOCUMENTS 8,066,074 B2  11/2011  Maskos et al.
8,100,179 B2  1/2012  Hermes et al.
(Continued)

FOREIGN PATENT DOCUMENTS

WO  2011060897  5/2011

OTHER PUBLICATIONS

International Search Report and Written Opinion for Application No. PCT/US2015/047738 dated May 31, 2016.

*Primary Examiner* — Andrew Sue-Ako
(74) *Attorney, Agent, or Firm* — Thomas Rooney; C. Tumey Law Group PLLC (57) ABSTRACT

A method of mitigating annular pressure buildup includes providing or using a foamed treatment fluid including: an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam; and introducing the foamed treatment fluid into a well bore annulus. A foamed treatment fluid includes an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam.

22 Claims, 7 Drawing Sheets

(56) References Cited

U.S. PATENT DOCUMENTS

| | | | |
|---|---|---|---|
| 8,360,151 B2 | 1/2013 | Williams et al. | |
| 2004/0182577 A1* | 9/2004 | Chatterji | C09K 8/04 166/305.1 |
| 2006/0030493 A1* | 2/2006 | Segura | C09K 8/685 507/244 |
| 2006/0116296 A1 | 6/2006 | Kippie et al. | |
| 2006/0213663 A1* | 9/2006 | Vargo, Jr. | C09K 8/032 166/292 |
| 2010/0113310 A1 | 5/2010 | Shepherd et al. | |
| 2015/0013988 A1 | 1/2015 | Ravi et al. | |
| 2018/0291251 A1* | 10/2018 | Gamwell | C09K 8/38 |

* cited by examiner

USE OF CROSSLINKED POLYMER SYSTEM FOR MITIGATION OF ANNULAR PRESSURE BUILDUP

BACKGROUND

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Secondary cementing operations may also be performed after the primary cementing operation. One example of a secondary cementing operation is squeeze cementing whereby a cement slurry is forced under pressure to areas of lost integrity in the annulus to seal off those areas.

After completion of the cementing operations, production of the oil or gas may commence. The oil and gas are produced at the surface after flowing through the wellbore. As the oil and gas pass through the wellbore, heat may be passed from such fluids through the casing and into the annular space, which typically results in expansion of any fluids in the annular space. Such an expansion may cause an increase in pressure within the annular space, which is known as annular pressure buildup. Annular pressure buildup typically occurs when the annular volume is fixed. For instance, the annular space may be closed (e.g., trapped). The annular space is trapped to isolate fluids within the annulus from areas outside the annulus. Trapping of an annular space typically occurs near the end of cementing operations after well completion fluids such as spacer fluids and cements are in place. The annular space is conventionally trapped by closing a valve, energizing a seal, and the like. Trapping presents operational problems. For instance, annular pressure buildup may cause damage to the wellbore such as damage to the cement sheath, the casing, tubulars, and other equipment.

A number of different techniques have been used to combat annular pressure buildup, including use of a syntactic foam wrapping on the casing, placing nitrified spacer fluids above the cement in the annulus, placing rupture disks in an outer casing string, designing "shortfalls" in the primary cementing operations such as designing the top of the cement column in an annulus to be short of the previous casing shoe, using hollow spheres, and others. However, such methods have drawbacks. For instance, the syntactic foam may cause flow restrictions during primary cementing of the casing within the wellbore. In addition, the syntactic foam may detach from the casing and/or become damaged as the casing is installed. Drawbacks with placing the nitrified spacer fluids include logistical difficulties (e.g., limited room for the accompanying surface equipment), pressure limitations on the well bore, and the typical high expenses related thereto. Further drawbacks with placing the nitrified spacer fluids include loss of returns when circulating the nitrified spacer into place and in situations wherein the geographic conditions provide difficulties in supplying the proper equipment for pumping the nitrified spacer. Additional drawbacks include the rupture disks so comprising the casing string after failure of the disks that continuing well bore operations may not be able to proceed. Further drawbacks include the designed "shortfall," which may not occur due to well bore fluids not being displaced as designed and cement channeling up to a casing shoe and trapping it. Moreover, problems with the hollow spheres include the spheres failing before placement in the annulus and inability to withstand repeated changes in pressure/temperature.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

This disclosure describes a method of foaming a two part crosslinked polymer system that can be used to mitigate Annular Pressure Buildup ("APB"). The disclosed system, when foamed, has the ability to compress (and change shape) as needed to mitigate APB buildup and other potential changes down hole to temperatures up to and above 400° F.

Figure 1:
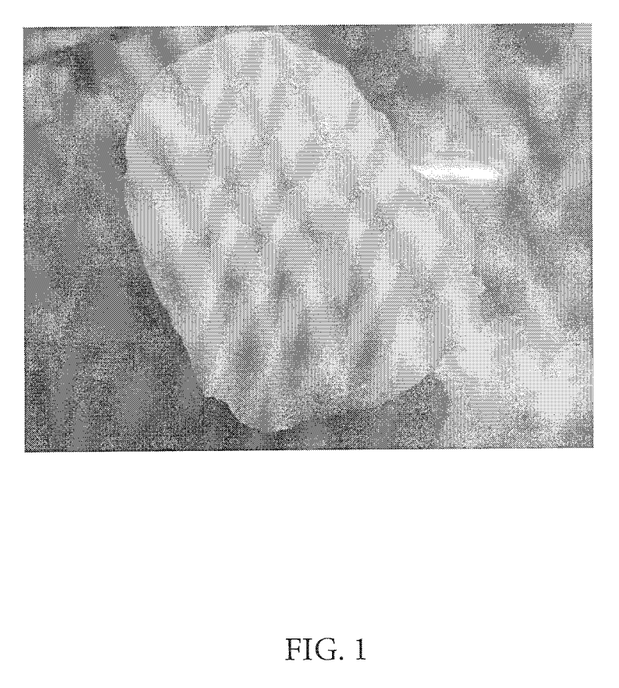
FIG. 1 is a photograph of an embodiment of the foamed crosslinked polymer system of the disclosure.

The polymer system disclosed is composed of several parts. The base is a linear or modified polymer comprising carbonyl groups and the crosslinker is an agent that comprises an amine group that is capable of crosslinking the polymer comprising carbonyl groups. These two compounds are mixed together to form a gel. With the addition of a foam surfactant, the gel may be foamed to varying quality. One embodiment of the final product, as seen in FIG. 1, is a solid, low density foam that is pliable, but resilient.

The materials used in the prior art have several drawbacks. As production fluids with increased temperatures of up to about 400° F. pass through production tubing, they can increase the annular fluid temperature significantly. Most prior art fluids are incapable of completely mitigating the pressure buildup at these very elevated temperatures. Further, as the temperature increases about 140° F., stabilizers, such as sodium bicarbonate, may be necessary. Many of the compounds of the present disclosure may mitigate APB buildup at temperatures up to and above 400° F.

Second, the crosslinkers used in the prior art are typically chromium based. These crosslinkers are less desired because certain chromium species can be toxic in nature. The compounds in the present disclosure do not utilize a chromium crosslinker.

Certain embodiments of mitigating APB comprise: providing or using a foamed treatment fluid including: an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam; and introducing the foamed treatment fluid into a well bore annulus. In some embodiments, the water-soluble polymer comprising carbonyl groups comprises at least one of the following: an acrylamide-based polymer, an oxidized polysaccharide, and combinations thereof. In an embodiment, the organic crosslinking agent that comprises an amine group that is capable of crosslinking the water-soluble polymer comprising carbonyl groups is selected from the group consisting of: a polyalkyleneimine; a polyethyleneimine, a polyalkylenepolyamine, a polyfunctional aliphatic amine, an arylalkylamine, a heteroarylalkylamine, and combinations thereof. In certain embodiments, the foamed treatment fluid contains no chromium crosslinking agents. In some embodiments, the foamed treatment fluid further comprises a gelling agent. This gelling agent may be a biopolymer. In many embodiments, the foam surfactant comprises at least one of an amphoteric surfactant, cationic surfactant, anionic surfactant, and combinations thereof. The foam surfactant may comprise at least one selected from the group consisting of betaines, sultaines, and imidazolinium, SLS, polyoxyethylene fatty alcohols, polyoxyethylene sorbitol esters, alkanolamides, sulfosuccinates, phospholipids, glycolipid, sodium lauryl sulfoacetate, alcohol ether sulfates, and combinations thereof. The foam surfactant may be present in the foamed treatment fluid at a concentration of about 0.005% to about 5% w/w of the aqueous base fluid. The quality of the foam may be from about 5% gas volume to about 99% gas volume. In some embodiments, the gas may be selected from the group consisting of nitrogen, carbon dioxide, air, methane, helium, argon, and any combination thereof. The method may further comprise using the treatment fluid to displace a drilling fluid from the well bore annulus; and introducing a cement composition into the well bore annulus, wherein the treatment fluid separates the cement composition from the drilling fluid.

In certain embodiments, a method of mitigating annular pressure buildup comprises: combining an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam; and introducing the foamed treatment fluid into a well bore annulus. In some embodiments, the method further comprises a mixer for combining the components and a pump for introducing the foamed treatment fluid into the well bore annulus.

In one embodiment, a foamed treatment fluid for mitigating annular pressure buildup comprises: an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foamed treatment fluid. In some embodiments, the water-soluble polymer comprising carbonyl groups comprises at least one of the following: an acrylamide-based polymer, an oxidized polysaccharide, and combinations thereof. In an embodiment, the organic crosslinking agent that comprises an amine group that is capable of crosslinking the water-soluble polymer comprising carbonyl groups is selected from the group consisting of: a polyalkyleneimine; a polyethyleneimine, a polyalkylenepolyamine, a polyfunctional aliphatic amine, an arylalkylamine, a heteroarylalkylamine, and combinations thereof. In certain embodiments, the foamed treatment fluid contains no chromium crosslinking agents. In some embodiments, the foamed treatment fluid further comprises a gelling agent. This gelling agent may be a biopolymer. In many embodiments, the foam surfactant comprises at least one of an amphoteric surfactant, cationic surfactant, anionic surfactant, and combinations thereof. The foam surfactant may comprise at least one selected from the group consisting of betaines, sultaines, and imidazolinium, SLS, polyoxyethylene fatty alcohols, polyoxyethylene sorbitol esters, alkanolamides, sulfosuccinates, phospholipids, glycolipid, sodium lauryl sulfoacetate, and combinations thereof. The foam surfactant may be present in the foamed treatment fluid at a concentration of about 0.005% to about 5% w/w of the aqueous base fluid. The quality of the foam may be from about 5% gas volume to about 99% gas volume. In some embodiments, the gas may be selected from the group consisting of nitrogen, carbon dioxide, air, methane, helium, argon, and any combination thereof.

Aqueous Base Fluids

The aqueous base fluid of the present embodiments can generally be from any source, provided that the fluids do not contain components that might adversely affect the stability and/or performance of the treatment fluids of the present invention.

In various embodiments, the aqueous base fluid can comprise fresh water, salt water, seawater, brine, or an aqueous salt solution. In some embodiments, the aqueous base fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some embodiments, the aqueous base fluid is present in the foamed treatment fluids in the amount of from about 20% to about 99% by volume of the fluid system.

Water Soluble Polymer

The foamed treatment fluids of the disclosure include a water soluble polymer comprising carbonyl groups. Generally, the water-soluble polymer comprising carbonyl groups should react, under appropriate conditions (e.g., time, temperature, the particular organic crosslinking agent chosen, etc.) with the organic crosslinking agent to form a crosslinked gel. The carbonyl groups may be contained in pendant groups of the water-soluble polymer or contained in the polymer backbone. Examples of suitable carbonyl groups include, but are not limited to, esters, aldehydes, ketones, anhydrides, amides, and carboxylic acid groups. Suitable water-soluble polymers comprising carbonyl groups include, but are not limited to, saturated or unsaturated acrylamide-based polymers. Examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N—N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, and mixtures and derivatives thereof. Those of ordinary skill in the art will recognize, with the benefit of this disclosure, that other suitable water-soluble polymers comprising carbonyl groups also may be used in the present invention.

In certain embodiments, the polymer comprising carbonyl groups includes oxidized starch. Examples of suitable starches include, but are not limited to, corn starch, potato starch, waxy maize, and dextrinized starch, and mixtures thereof. A wide variety of oxidizers can be used to oxidize starch. Examples of oxidizers suitable for use in the present invention include, but are not limited to, sodium hypochlorite, sodium periodate, hydrogen peroxide, and peracetic acid, and mixtures thereof. Those skilled in the art, with the benefit of this disclosure, will appreciate that related oxidized polysaccharides, other than oxidized starch, can be used to crosslink with the organic crosslinking agent, including oxidized cellulose, oxidized agarose, oxidized partially-acetylated cellulose, and oxidized gums, and mixtures thereof. Other compounds that may be used include dialdehyde starch (DAS) and dialdehyde cellulose, and mixtures thereof. In certain embodiments, the oxidized polysaccharides contain at least some ketone, aldehyde, or anhyride functional groups upon oxidation. In certain embodiments, the oxidized polysaccharides may be used in combination with any of the above-listed water-soluble polymers.

Generally, by increasing the fraction of bulky or less reactive monomers in the water-soluble polymer comprising carbonyl groups, the temperature at which gelation occurs may be increased and/or the pumping time at a given temperature may be increased. One of ordinary skill in the art with the benefit of this disclosure will recognize an appropriate water-soluble polymer comprising carbonyl groups based on, among other factors, the temperature of the formation and the desired pumping time.

The water-soluble polymers comprising carbonyl groups should be present in the crosslinkable polymer compositions of the present invention in an amount sufficient to provide the desired pumping time before gelation and the desired crosslinking reaction. In certain embodiments, the water-soluble polymers comprising carbonyl groups may be present in an amount in the range of from about 0.5% to about 20% by weight of the composition. In certain embodiments, the water-soluble polymer comprising carbonyl groups may be present in an amount in the range of from about 0.6% to about 12% by weight of the composition.

Organic Crosslinking Agents

One component of the foamed treatment fluids of the disclosure includes an organic crosslinking agent. Suitable organic crosslinking agents should be capable of undergoing a crosslinking reaction with the water-soluble polymers that comprise carbonyl groups. Under the appropriate conditions (e.g., time, temperature), the organic crosslinking agent should react with the water-soluble polymer to form a crosslinked gel.

Suitable organic crosslinking agents may contain amine groups that are capable of undergoing a crosslinking reaction with the water-soluble polymers that comprise carbonyl groups. Examples of suitable organic crosslinking agents include, but are not limited to, polyalkyleneimines (e.g., polyethyleneimine), polyalkylenepolyamines, polyfunctional aliphatic amines, arylalkylamines, heteroarylalkylamines, and mixtures thereof. In certain embodiments, the organic crosslinking agent comprises polyethyleneimine ("PEI").

The organic crosslinking agent should be included in the crosslinkable polymer compositions of the present invention in an amount sufficient to provide the desired crosslinking reaction. In certain embodiments, the organic crosslinking agent may be present in an amount in the range of from about 0.05% to about 15% by weight of the composition. In certain embodiments, the organic crosslinking agent may be present in an amount in the range of from about 0.5% to about 5% by weight of the composition.

Foam Surfactants

In an embodiment, the present disclosure utilizes foam surfactants to increase the quality of the stabilize foams and add stability to the foams. In some embodiments, the foam surfactants are selected from an amphoteric surfactant, cationic surfactant, anionic surfactant, and combinations thereof.

Useful foam surfactants include betaines, sultaines, and imidazolinium such as cocamidopropyl betaine and sodium lauraminopropionate, sodium lauryl sulfate (SLS) and other fatty alcohol ether sulfates including SLES, polyoxyethylene fatty alcohols and polyoxyethylene sorbitol esters and alkanolamides, sulfosuccinates (e.g. disodium laureth sulfosuccinate), phospholipids, glycolipid, sodium lauryl sulfoacetate, and combinations thereof. In certain embodiments, combinations of surfactants, i.e., co-surfactants, work together to provide a useful foam surfactant.

In exemplary embodiments, the foam surfactant is present in the foamed treatment fluid at a concentration of about 0.005% to about 5% w/w of the aqueous base fluid.

Gas

In some embodiments, the gas is selected from the group consisting of nitrogen, carbon dioxide, air, methane, helium, argon, and any combination thereof. In some embodiments, the quality of the foamed fracturing fluid may range from a lower limit of about 5%, 10%, 25%, 40%, 50%, 60%, or 70% gas volume to an upper limit of about 99%, 90%, 80%, 75%, 60%, or 50% gas volume, and wherein the quality of the foamed treatment fluid may range from any lower limit to any upper limit and encompass any subset between the upper and lower limits.

Gelling Agents

The foamed treatment fluids may include a gelling agent. A "base gel" is a fluid that includes a viscosity-increasing agent, such as guar, but that excludes, for example, fluids that are typically referred to as "crosslinked gels" and "surfactant gels."

In the aqueous based fluid, a variety of gelling agents may be used, including hydratable polymers that contain one or more functional groups such as hydroxyl, carboxyl, sulfate, sulfonate, amino, or amide groups. Suitable gelling agents typically comprise natural polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucose, xylose, arabinose, fructose, glucuronic acid, or pyranosyl sulfate. Examples of suitable polymers include, but are not limited to, xanthan, guar, guar derivatives (such as hydroxypropyl guar, carboxymethyl guar, and carboxymethylhydroxypropyl guar), and cellulose derivatives (such as hydroxyethyl cellulose and carboxylmethyl hydroxy ethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone.

The aqueous base fluid may include aqueous linear gels, aqueous linear polysaccharide gels, aqueous linear guar gels, slick water, water, brine, viscoelastic surfactant solution, and combinations thereof.

Other Additives

In addition to the foregoing materials, it can also be desirable, in some embodiments, for other components to be present in the treatment fluid. Such additional components can include, without limitation, particulate materials, proppants, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

Methods of Use

Embodiments of the treatment fluids may be used in various wellbore servicing operations. For instance, the treatment fluid may be a spacer fluid, a drilling fluid, a completion fluid such as a cement composition, or a spotting fluid. In accordance with present embodiments, the treatment fluid may be placed into a well bore annulus. Generally, an operator may circulate one or more additional fluids (e.g., a cement composition) into place within the subterranean annulus behind embodiments of the treatment fluids. At least a portion of embodiments of the treatment fluids then may become trapped within the well bore annulus. In some embodiments, at least a portion of the treatment fluid may become trapped at a point in time after a cement composition has been circulated into a desired position within the annulus to the operator's satisfaction.

An example of a method includes a method of servicing a well bore comprising the steps of: providing a treatment fluid that comprises a foamed and crosslinked polymer; and introducing the treatment fluid into a well bore annulus. Additional method steps may include one or more of: using the treatment fluid to displace a drilling fluid from the well bore annulus; introducing a cement composition into the well bore annulus, wherein the treatment fluid separates the cement composition from the drilling fluid; allowing the cement composition to set in the well bore annulus; or allowing at least a portion of the treatment fluid to become trapped in the well bore annulus. In certain exemplary embodiments, the treatment fluid may become trapped in the well bore annulus, for example, after the treatment fluid has been placed into the well bore annulus. In alternative embodiments, the treatment fluid may be a drilling fluid that is circulated in a well bore annulus while drilling the well bore. At least a portion of the drilling fluid may be left in the well bore after drilling operations are complete.

The treatment fluids of the present invention may be prepared by any method suitable for a given application. For example, certain components of the treatment fluid of the present invention may be provided in a pre-blended powder or a dispersion of powder in a liquid, which may be combined with the aqueous base fluid at a subsequent time. After these components are combined, the foamer may be injected into the liquid stream. Following this procedure, a gas, such as nitrogen, may be injected to foam the treatment fluid. Further other suitable additives may be added prior to introduction into the wellbore. Those of ordinary skill in the art, with the benefit of this disclosure will be able to determine other suitable methods for the preparation of the treatments fluids of the present invention.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the treatment fluids, and any additional additives, disclosed herein.

Figure 2:
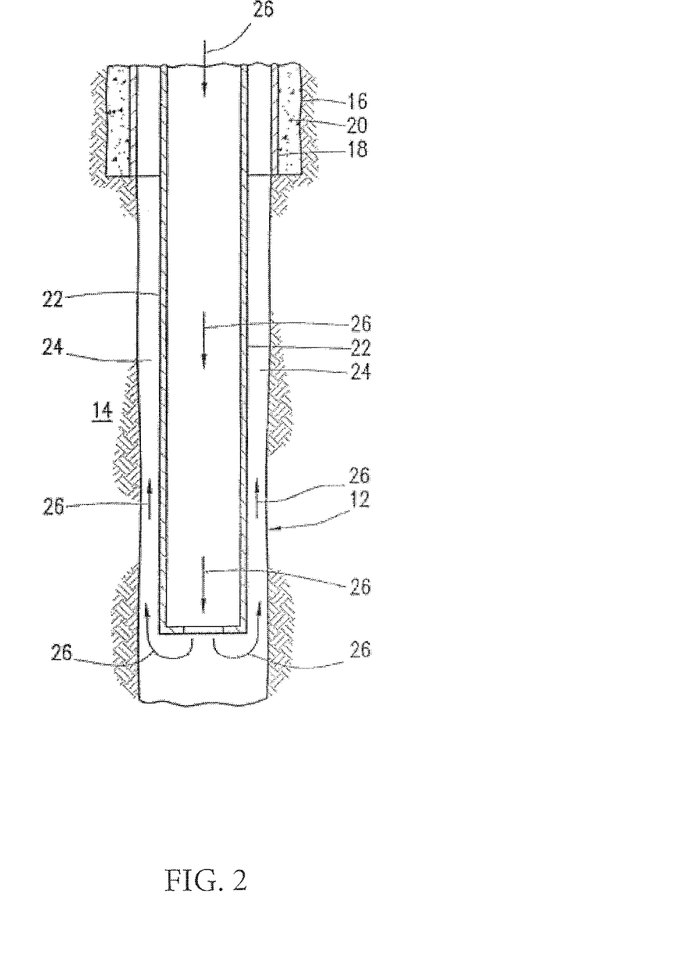
FIG. 2 depicts an embodiment of placing the foamed treatment fluids in a well bore annulus.
Figure 4:
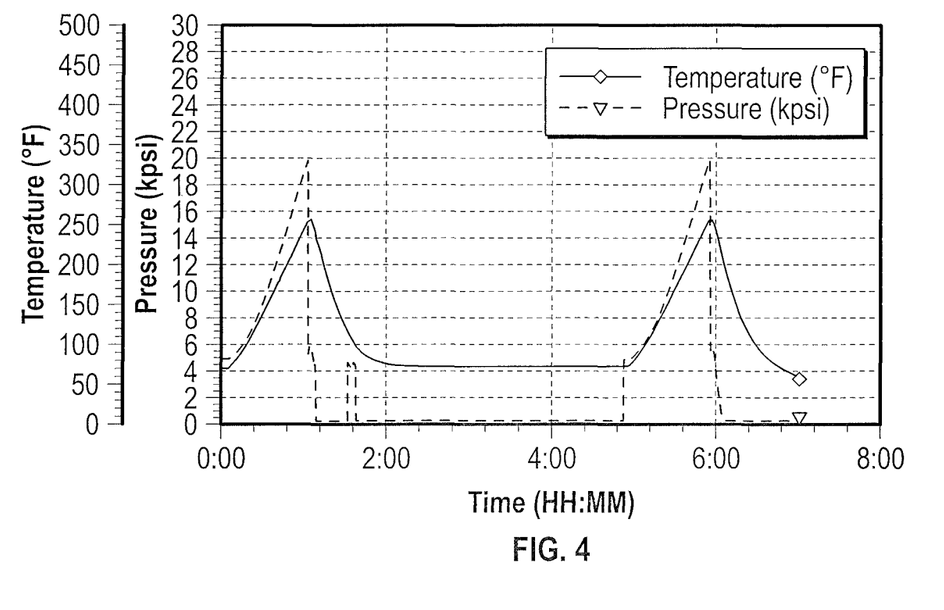
FIG. 4 is a graph of pressure vs time of water being heated in a UCA.

Embodiments of the treatment fluids may be placed in well bore annulus in any suitable fashion. The well bore annulus will be an annulus between a pipe string (e.g., casing, tubing, etc.) and a subterranean formation and/or between a pipe string and a larger conduit in the well bore. For example, the treatment fluids may be placed into the well bore annulus directly from the surface. Alternatively, the treatment fluids may be flowed into a well bore via the casing and permitted to circulate into place in a well bore annulus between the casing and the subterranean formation or between the casing and a large conduit. FIG. 2 illustrates placement of the treatment fluid into a well bore 12 in accordance with example embodiments. As illustrated, the well bore 12 may be drilled into the subterranean formation 14. While well bore 12 is shown extending generally vertically into the subterranean formation 14, example embodiments are also applicable to well bores that extend at an angle through the subterranean formation 14, such as horizontal and slanted well bores. The well bore 12 comprises walls 16. As illustrated, a surface casing 18 has been inserted into the well bore 12. The surface casing 18 may be cemented to the walls 16 of the well bore 12 by cement sheath 20. In the illustrated embodiment, one or more additional pipe strings, shown here as casing 22 may also be disposed in the well bore 12. As illustrated, there is a well bore annulus 24 formed between the casing 22 and the walls 16 of the well bore 12 and/or the surface casing 18. Embodiments of the treatment fluids may be prepared by a variety of methods as will be apparent to those of ordinary skill. The treatment fluid may then be pumped down the casing 22, as shown in FIG. 4 by directional arrows 26. The treatment fluid may be allowed to flow down through the bottom of the casing 22 and up around the casing 22 into the well bore annulus 24.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 3:
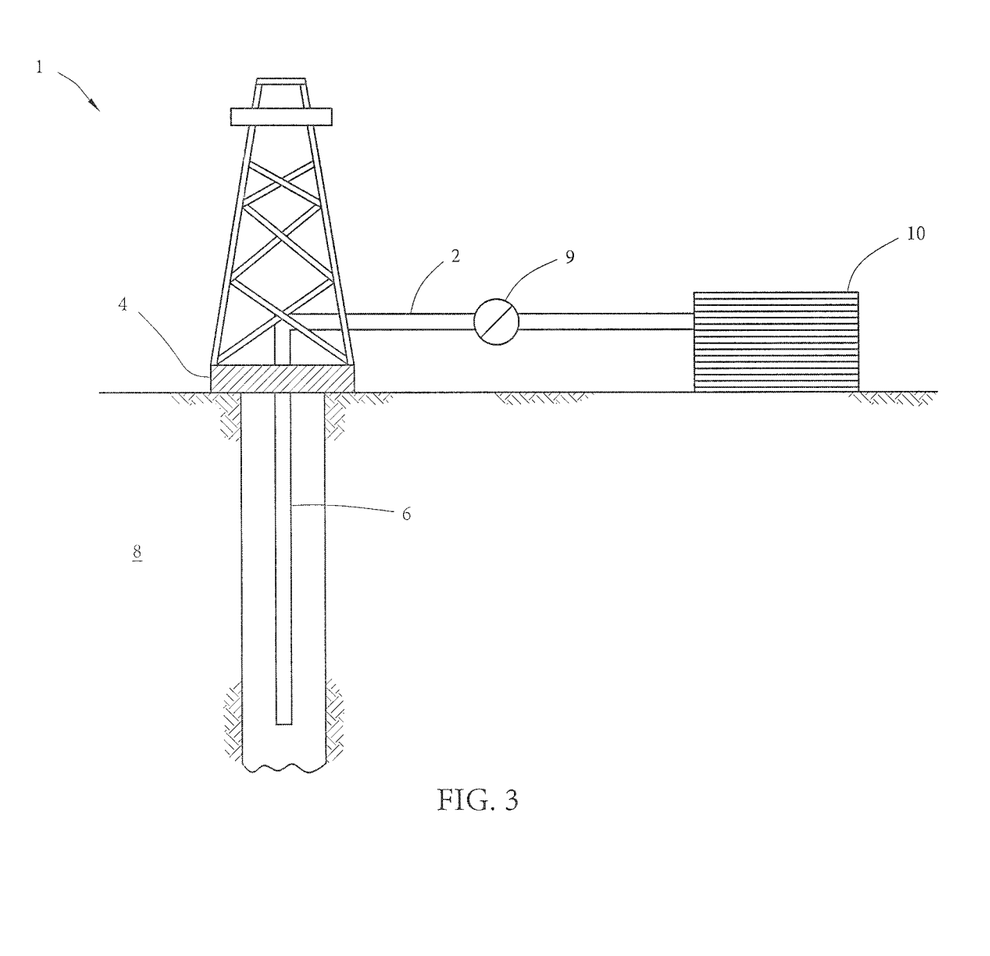
FIG. 3 depicts an embodiment of a system configured for making and delivering the foamed treatment fluids of the embodiments described herein to a well bore annulus.

FIG. 3 shows an illustrative schematic of a system that can deliver treatment fluids of the embodiments disclosed herein to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which a treatment fluid of the embodiments disclosed herein may be formulated. The treatment fluid may be conveyed via line 2 to wellhead 4, where the treatment fluid enters tubular 6, tubular 6 extending from wellhead 4 into subterranean formation 8. Upon being ejected from tubular 6, the treatment fluid may subsequently penetrate into subterranean formation 8. Pump 9 may be configured to raise the pressure of the treatment fluid to a desired degree before its introduction into tubular 6. It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the treatment fluid may, in some embodiments, flow back to wellhead 4 and exit subterranean formation 8. In some embodiments, the treatment fluid that has flowed back to wellhead 4 may subsequently be recovered and recirculated to subterranean formation 8.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Experimental procedure:

The foams described in Table 1 below were tested for the efficacy of APB mitigation via comparative testing with water and its liquid unfoamed counterpart. Each of the materials was poured into a UCA and pressurized before being heated to 282° F. The unfoamed base slurry was prepared prior to foaming, and was foamed using the procedure in API RP 10B-4 (July 2004), Section 7.

TABLE 1

| Component | Base Slurry (g) | gal or lb/sk | % BWOC |
|---|---|---|---|
| Water | 649.06 | 18.314 gal/sk | 162 |
| HZ-30 ™ | 400.0 | 94 lb/sk | |
| SA-1015 ™ | 7.12 | 1.673 lb/sk | 1.78 |
| KCl (5%) | 22.0 | | 3.4 |
| HZ-20 ™ | 46.23 | 1.228 gal/sk | 7.1 |
| Foamer 1026 ™ | 5.24 | 0.243 gal/sk | 1.3 |

Final Foam density = 6.60 lb/gal
Foam Quality = 24.04% Gas
HZ-30 ™ conformance material is a high molecular weight polyacrylamide used in production enhancement. SA-1015 ™ suspending agent is an additive to prevent solids from settling and to control free fluid in cement slurries. HZ-20 ™ crosslinker provides organic crosslinking. Foamer 1026 ™ Foamer/Stabilizer is a blend of a foam stabilizer and a primary foamer. All are available from Halliburton Energy Services, Inc., Houston, Texas.

As seen in FIG. 4, after being placed into a UCA and heated, water quickly begins to build pressure, hitting the upper operating limit of the UCA and requiring pressure to be dumped. Two cycles of heating are demonstrated.

Figure 5:
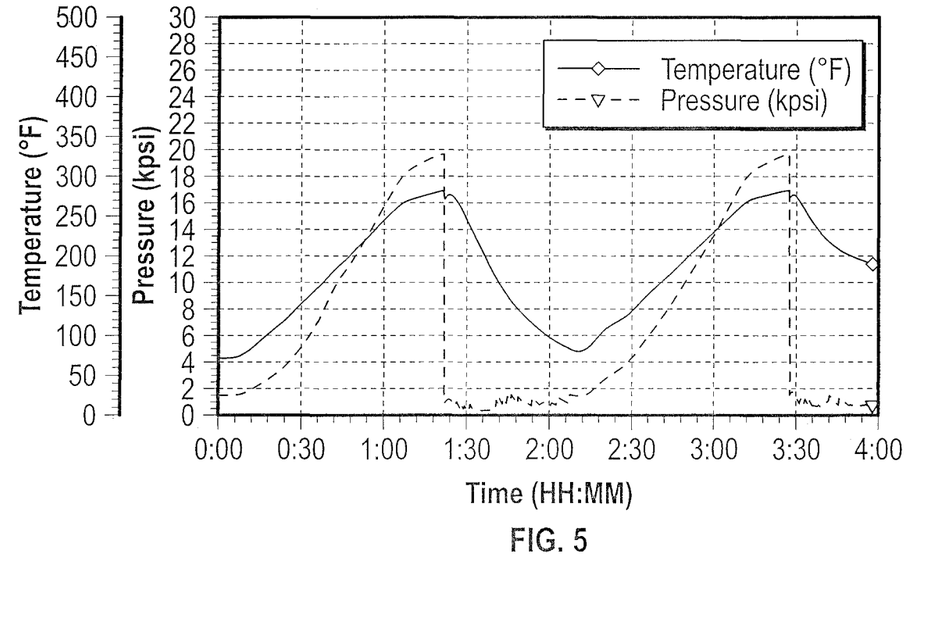
FIG. 5 is a graph of pressure vs. time of the liquid variant of an unfoamed treatment fluid being heated according to the disclosure.
Figure 6:
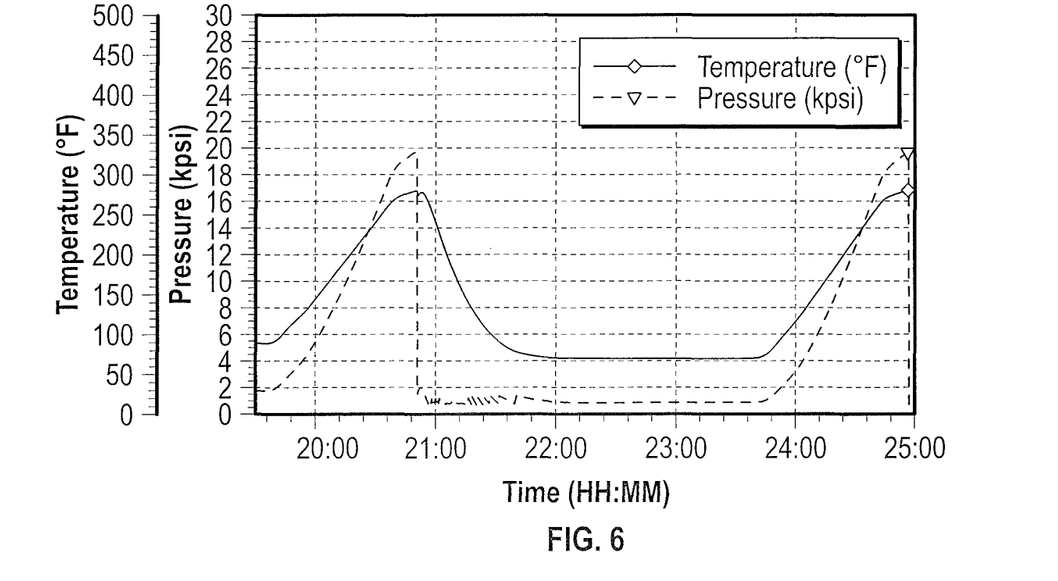
FIG. 6 is a graph of pressure vs. time of the gelled variant of an unfoamed treatment fluid being heated according to the disclosure.

Next, an unfoamed variant of the treatment fluid was mixed and heated in the UCA to 282° F. As shown in FIG. 5, while it takes longer for the unfoamed fluid to reach the upper pressure limit of the UCA being used, the continued build of pressure after the temperature is reached requires pressure to be vented from the cell. This test was performed on the liquid variant of the unfoamed treatment fluid mixture. This material was tested a second time after it had an opportunity to set. In its gelled form, the material behaved similarly, though not exactly like its liquid counterpart. Looking closely at the graph in FIG. 6, it may be seen that the pressure curves become a bit steeper. Here, too, when temperature is reached, the UCA cell is vented to prevent additional pressure buildup.

Figure 7:
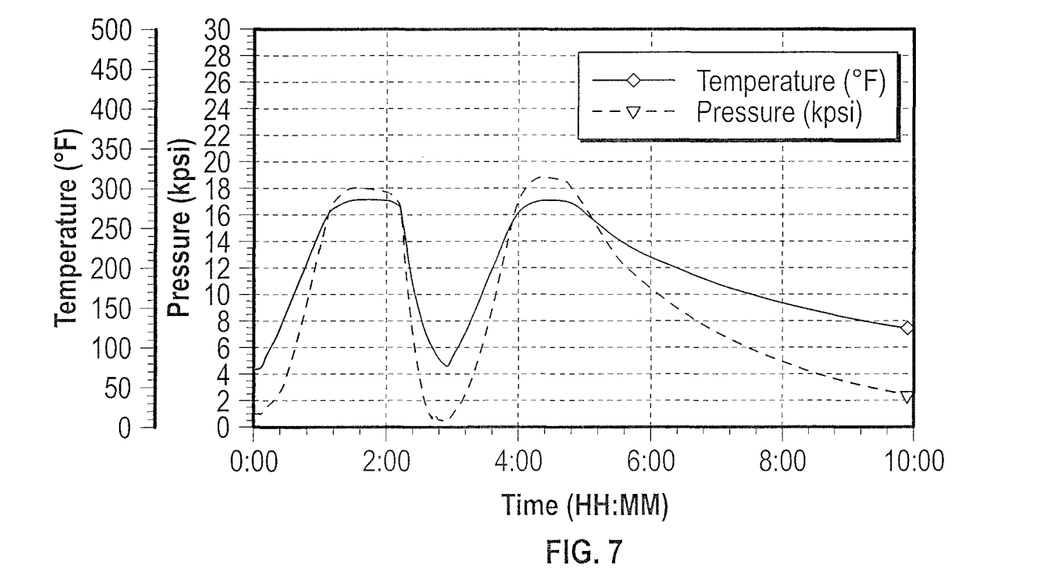
FIG. 7 is a graph of pressure vs. time of the liquid variant of an foamed treatment fluid being heated according to the disclosure.

The foamed variant of the foamed treatment fluid displays a different behavior than both water and the liquid variant of the treatment fluid (see FIG. 7). When foamed and heated in the UCA cell, the liquid mixture doesn't quite reach the upper pressure limit of the UCA. This may indicate a level of pressure mitigation during the heating phase of the test. Furthermore, after temperature is reached, the material appears to mitigate some of the pressure being placed on it. During the second cycle, however, a slightly higher pressure than before is reached. This may be indicative of the foam being compressed within the UCA cell.

Figure 8:
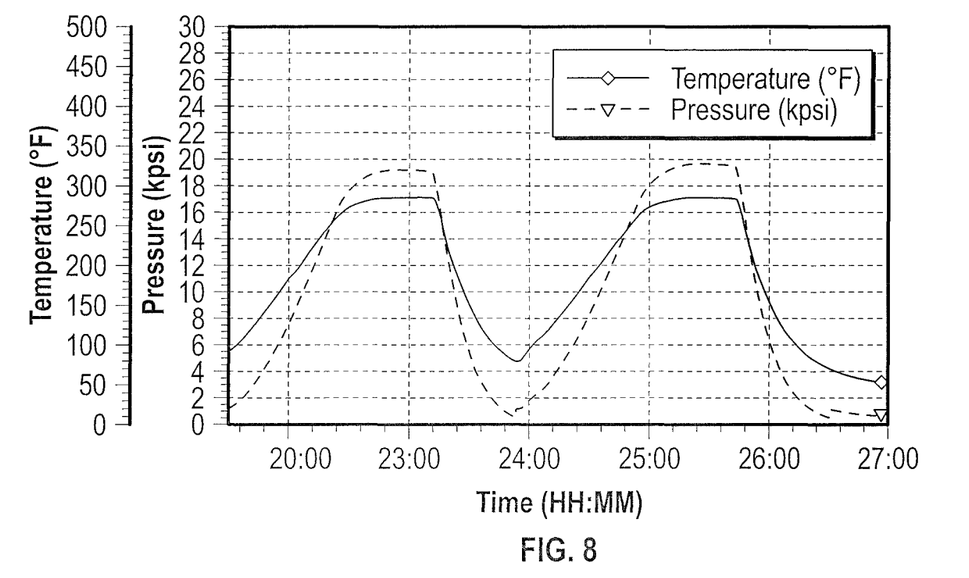
FIG. 8 is a graph of pressure vs. time of the gelled variant of an foamed treatment fluid being heated according to the disclosure.

After the liquid foam mixture was able to set, the heating cycles were run a second time (FIG. 8). Again, when temperature was reached, the foam was able to adapt to the pressure placed on it. While there isn't as significant a decrease as the liquid foamed counterpart, the solid foam still manages to keep the pressure buildup, due to temperature, from spiking rapidly like in the case of water and the liquid treatment fluid variant.

One of skill in the art may conclude from the formed derivative that the total pressure built when heating to 282° F. was dampened and compensated for by the foamed material.

Figure 9A:
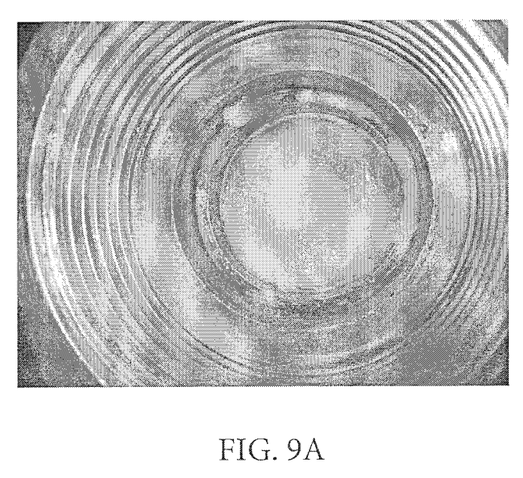
FIGS. 9A,B are photographs of the foamed, gelled material after testing in the UCA.
Figure 9B:
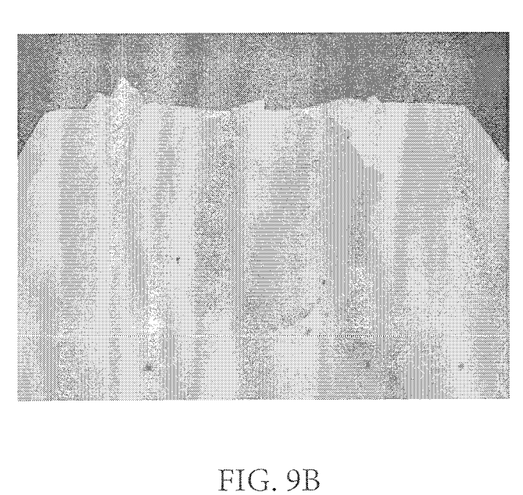

After testing was completed, the UCA cell was opened and the foamed material was removed. As seen in FIG. 9A, the foam seems to be intact. When completely removed from the cell, the foam as seen in FIG. 9B, though discolored from heating, is still in satisfactory shape.

Embodiments disclosed herein include:

A: A method of mitigating annular pressure buildup comprising providing or using a foaming treatment fluid including: an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam; and introducing the foamed treatment fluid into a well bore annulus.

B: A method of mitigating annular pressure buildup comprising combining an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foam; and introducing the foamed treatment fluid into a well bore annulus.

C: A foamed treatment fluid for mitigating annular pressure buildup comprising providing or using a foamed treatment fluid including: an aqueous base fluid; a water-soluble polymer comprising carbonyl groups; an organic crosslinking agent that comprises an amine group that is capable of crosslinking the water-soluble polymer comprising carbonyl groups; a foam surfactant; and sufficient gas to form a foamed treatment fluid.

Each of embodiments A, B, and C may have one or more of the following additional elements in any combination: Element 1: wherein the water-soluble polymer comprising carbonyl groups comprises at least one of the following: an acrylamide-based polymer, an oxidized polysaccharide, and combinations thereof. Element 2: wherein the organic crosslinking agent that comprises an amine group that is capable of crosslinking the water-soluble polymer comprising carbonyl groups is selected from the group consisting of: a polyalkyleneimine, a polyalkylenepolyamine, a polyfunctional aliphatic amine, an arylalkylamine, a heteroarylalkylamine, and combinations thereof. Element 3: wherein the foamed treatment fluid includes no chromium crosslinking agents. Element 4: wherein the foamed treatment fluid further comprises a gelling agent. Element 5: wherein the gelling agent is a biopolymer. Element 6: wherein the foam surfactant comprises at least one of an amphoteric surfactant, cationic surfactant, anionic surfactant, and combinations thereof. Element 7: wherein the foam surfactant comprises at least one selected from the group consisting of betaines, sultaines, and imidazolinium, SLS, polyoxyethylene fatty alcohols, polyoxyethylene sorbitol esters, alkanolamides, sulfosuccinates, phospholipids, glycolipid, sodium lauryl sulfoacetate, alcohol ether sulfates, and combinations thereof. Element 8: wherein the foam surfactant is present in the foamed treatment fluid at a concentration of about 0.005% to about 5% w/w of the aqueous base fluid. Element 9: wherein the quality of the foam is from about 5% gas volume to about 99% gas volume. Element 10: wherein the gas is selected from the group consisting of nitrogen, carbon dioxide, air, methane, helium, argon, and any combination thereof. Element 11: further comprising using the treatment fluid to displace a drilling fluid from the well bore annulus; and introducing a cement composition into the well bore annulus, wherein the treatment fluid separates the cement composition from the drilling fluid. Element 12: further comprising a mixer for combining the components and a pump for introducing the foamed treatment fluid into the well bore annulus.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of mitigating annular pressure buildup comprising:
   providing or using a foamed treatment fluid including:
      an aqueous base fluid;

a water-soluble polymer comprising carbonyl groups comprising at least one of an acrylamide-based polymer, an oxidized polysaccharide, and combinations thereof;

an organic crosslinking agent comprising polyethyleneimine, wherein the organic crosslinking agent is present in an amount of about 0.5% to about 15% by weight of the foaming treatment fluid;

a foam surfactant; and sufficient gas to form a foam; and introducing the foamed treatment fluid into a well bore annulus.

2. The method of claim 1, wherein the foamed treatment fluid includes no chromium crosslinking agents.

3. The method of claim 1, wherein the foamed treatment fluid further comprises a gelling agent.

4. The method of claim 3, wherein the gelling agent is a biopolymer.

5. The method of claim 1, wherein the foam surfactant comprises at least one of an amphoteric surfactant, cationic surfactant, anionic surfactant, and combinations thereof.

6. The method of claim 5, wherein the foam surfactant comprises at least one selected from the group consisting of betaines, sultaines, and imidazolinium, sodium lauryl sulfate, polyoxyethylene fatty alcohols, polyoxyethylene sorbitol esters, alkanolamides, sulfosuccinates, phospholipids, glycolipid, sodium lauryl sulfoacetate, alcohol ether sulfates, and combinations thereof.

7. The method of claim 1, wherein the foam surfactant is present in the foamed treatment fluid at a concentration of about 0.005% to about 5% w/w of the aqueous base fluid.

8. The method of claim 1, wherein the quality of the foam is from about 5% gas volume to about 99% gas volume.

9. The method of claim 1, wherein the gas is selected from the group consisting of nitrogen, carbon dioxide, air, methane, helium, argon, and any combination thereof.

10. The method of claim 1, further comprising using the treatment fluid to displace a drilling fluid from the well bore annulus; and introducing a cement composition into the well bore annulus, wherein the treatment fluid separates the cement composition from the drilling fluid.

11. A method of mitigating annular pressure buildup comprising:

combining:
an aqueous base fluid;
a water-soluble polymer comprising dialdehyde starch, dialdehyde cellulose, or combinations thereof;
an organic crosslinking agent comprising polyethyleneimine;
a foam surfactant; and
sufficient gas to form a foam; and
introducing the foamed treatment fluid into a well bore annulus.

12. The method of claim 11, wherein the water-soluble polymer further comprises at least one of the following: an acrylamide-based polymer, an oxidized polysaccharide, and combinations thereof.

13. The method of claim 11, wherein the foamed treatment fluid includes no chromium crosslinking agents.

14. The method of claim 11, wherein the foamed treatment fluid further comprises a gelling agent.

15. The method of claim 14, wherein the gelling agent is a biopolymer.

16. The method of claim 11, wherein the foam surfactant comprises at least one of an amphoteric surfactant, cationic surfactant, anionic surfactant, and combinations thereof.

17. The method of claim 16, wherein the foam surfactant comprises at least one selected from the group consisting of betaines, sultaines, and imidazolinium, sodium lauryl sulfate, polyoxyethylene fatty alcohols, polyoxyethylene sorbitol esters, alkanolamides, sulfosuccinates, phospholipids, glycolipid, sodium lauryl sulfoacetate, alcohol ether sulfates, and combinations thereof.

18. The method of claim 11, wherein the foam surfactant is present in the foamed treatment fluid at a concentration of about 0.005% to about 5% w/w of the aqueous base fluid.

19. The method of claim 11, wherein the quality of the foam is from about 5% gas volume to about 99% gas volume.

20. The method of claim 11, wherein the gas is selected from the group consisting of nitrogen, carbon dioxide, air, methane, helium, argon, and any combination thereof.

21. The method of claim 11, further comprising using the treatment fluid to displace a drilling fluid from the well bore annulus; and introducing a cement composition into the well bore annulus, wherein the treatment fluid separates the cement composition from the drilling fluid.

22. The method of claim 11, further comprising a mixer for combining the components and a pump for introducing the foamed treatment fluid into the well bore annulus.

* * * * *